United States Patent Office 3,728,085
Patented Apr. 17, 1973

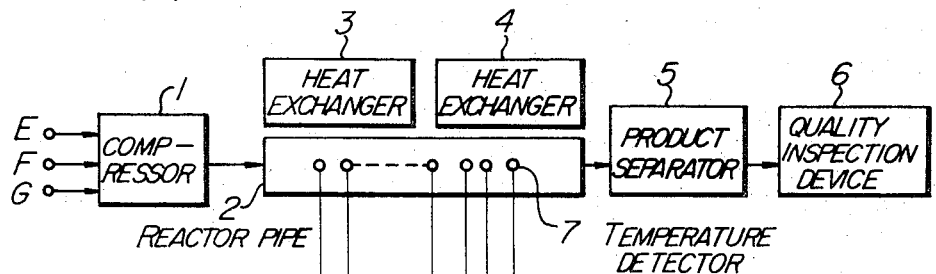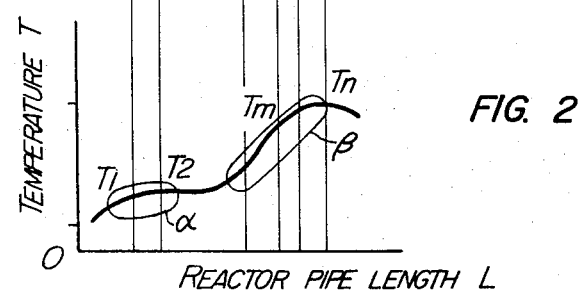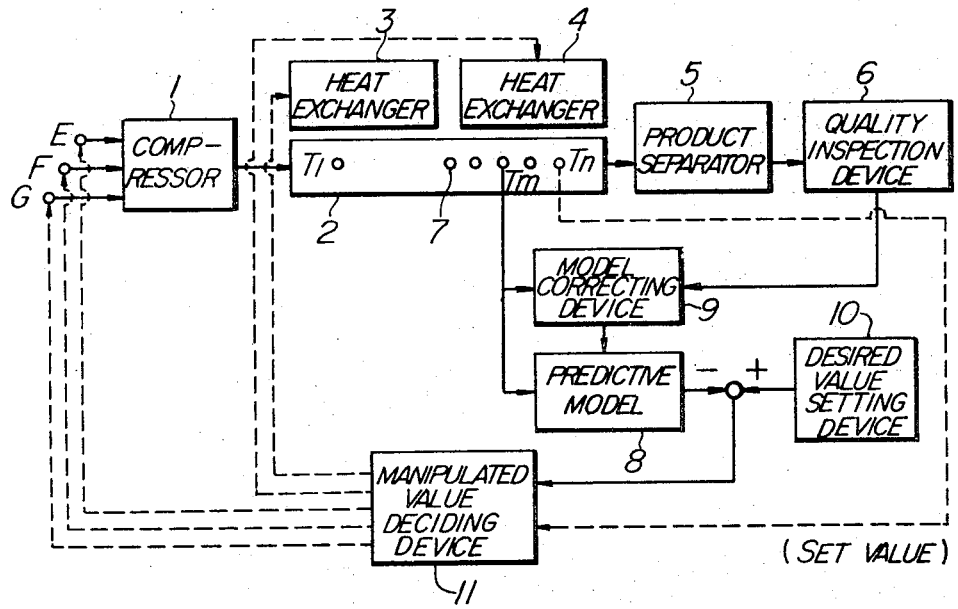

3,728,085
PREDICTIVE CONTROL SYSTEM FOR POLYMERIZING ETHYLENE
Shunichiro Horiguchi, Shunichi Iizuka, and Masato Takami, Tokyo, Naomichi Furutani, Higashi-Murayama, and Koichi Haruna and Tomoo Ishikawa, Kodaira, Japan, assignors to Mitsubishi Petrochemical Company Limited, Tokyo, Japan
Filed Sept. 15, 1970, Ser. No. 72,328
Claims priority, application Japan, Oct. 1, 1969, 44/78,284
Int. Cl. C08f 1/98
U.S. Cl. 23—284                                2 Claims

ABSTRACT OF THE DISCLOSURE

In a tubular ethylene polymerization apparatus in which a mixture of ethylene gas, an initiator, a modifier and other required agents are compressed in a compressor and supplied into a tubular reactor for causing a polymerizing reaction in the reactor under heat exchange and the reaction product is passed through a product separator to separate an ethylene polymer from any unreacted gas, the quality of the ethylene polymer thus obtained being then measured by a quality inspection device, a predictive control system comprising temperature detecting means for detecting the temperature distribution within the reactor, a predictive model for predicting a quality value from the temperature value detected in a highest reaction zone in the reactor, a model correcting device for correcting the predictive model on the basis of the detected temperature value and the measured quality value, and a manipulated value deciding device for changing one or more manipulated variables controlling the reaction within the reactor depending on the deviation of the predictive quality value from a desired quality value.

---

This invention relates to a predictive control system for a tubular ethylene polymerization apparatus.

As is commonly known, a tubular ethylene polymerization apparatus has a structure as shown in FIG. 1 in which it will be seen that a mixture of ethylene gas E, which is the raw material, and the required agents including an initiator F and a modifier G are compressed in a compressor 1 and are then supplied into a tubular reactor 2. The fluid supplied into the reactor 2 is subject to heat exchange through the reactor wall with a high-temperature fluid flowing through a heat exchanger 3. When a reaction starting temperature is reached, an abrupt polymerizing reaction takes place and the temperature of the fluid in the reactor 2 rises abruptly. This polymerizing reaction attenuates and ceases in a short period of time. The fluid in the reactor 2 is then subject to heat exchange through the reactor wall with a low-temperature fluid flowing through a heat exchanger 4 with the result that the temperature of the fluid is reduced, and the fluid at a reduced temperature is discharged from the reactor 2. The reaction product including an ethylene polymer and unreacted ethylene gas is supplied to a product separator 5 where the ethylene polymer is separated from unreacted ethylene gas, and the quality of the product is then measured by a quality inspection device 6.

It is very important in such a polymerization apparatus to maintain the quality of the product thus obtained at a required value. The factors controlling the quality of the product includes the concentration of the initiator, the concentration of the modifier, and the reaction pressure and temperature in the reactor. One or more of these factors may be taken as manipulated variables so as to control the qaulity to be constant. However, the process involves a problem in that a considerable time lag due to the pipe residence time, separator residence time, etc. inevitably exists until any change in the quality of the product is finally measured by the quality inspection device 6 after a suitable variation of these manipulated variables. Because of the presence of such a time lag, with the prior art feedback control system for varying the manipulated variables on the basis of the quality value indicated on the quality inspection device 6, it has been difficult to assure controllability to a desired precision.

It is therefore an object of the present invention to provide a novel predictive control system for an ethylene polymerization apparatus for maintaining the quality of the product at a predetermined value by predicting a change in the quality of the product on the basis of a variation of the temperature in a highest reaction zone in the ethylene polymerization apparatus.

Another object of the present invention is to provide, in a tubular ethylene polymerization apparatus of the kind described above, a predictive control system which comprises temperature detecting means for detecting the temperature distribution within a reactor, a predictive model for predicting a quality value such as a melt index value of the ethylene polymer from the value of temperature detected in a highest reaction zone in the reactor, a model correcting device correcting the predictive model on the basis of the detected temperature value and the measured quality value, and a manipulated value deciding device for changing one or more manipulated variables depending on the deviation of the predictive quality value from a desired quality value in order to compensate for a time lag as described above, thereby controlling the quality to be constant and improving the precision of control.

According to the present invention, the time lag in an ethylene polymerization plant is eliminated so that an exact predictive control can be carried out to provide a marked effect in respect of the quality control of the product.

Other objects, features and advantages will be readily apparent from the following detailed description of an embodiment of the present invention taken in conjunction with the accompanying drawings, in which:

FIG. 1 is a block diagram showing a general structure of a tubular ethylene polymerization apparatus;

FIG. 2 is a graph showing the temperature distribution in the tubular reactor in which the vertical and horizontal axes represent the temperature T in the reactor and the total length L of the reactor, respectively; and FIG. 3 is a block diagram showing the structure of an embodiment of the present invention.

Referring to FIG. 1 again, a large quantity of heat is produced in the reactor 2 in the ethylene polymerization apparatus due to the ethylene polymerizing reaction and a sharp rise in the temperature within the reactor 2 takes place in a zone where the polymerizing reaction proceeds vigorously as previously described. A plurality of temperature detectors 7 were disposed at suitable intervals within the reactor 2 along its axis to find the temperature distribution within the reactor 2. The temperature indicated by the respective temperature detectors 7 are shown in FIG. 2. It has thus been clarified that a reaction zone $\alpha$ where the temperature T within the reactor 2 varies relatively gradually and a highest reaction zone $\beta$ where a sharp temperature rise occurs are present in the reactor 2. It is apparent that the greater part of the ethylene polymer is produced in the highest reaction bone $\beta$. Therefore, it is easily presumed that a temperature $Tm$ in this zone represents best the formation of the product and is the greatest factor for the control of the quality of the ethylene polymer being produced. The results of an experiment made by the inventors on a practical ethylene polymerization plant have proved that there is a strong correlation between the temperature $Tm$ in the highest reaction zone $\beta$ and the quality value indicated on the quality inspection device 6. Thus, the inventors have discovered that the quality of the product can be predicted from the detected value of the temperature $Tm$. By the employment of a control system for predicting the quality of the product from the temperature $Tm$ in the highest reaction zone $\beta$, therefore, the time lag due to the product separator residence time and the like can be eliminated and the controllability can be improved.

An embodiment of the present invention is shown in FIG. 3 in which like reference numerals are used to denote like parts appearing in FIG. 1. Referring to FIG. 3, one of temperature detectors 7 measures the temperature $Tm$ in the highest reaction zone $\beta$, and a predictive model 8 predicts a quality value $Q'$ such as a melt index value from the actually measured value of temperature $Tm$ on the basis of the following equation:

$$Q' = aTm + b \quad (1)$$

A model correcting device 9 corrects the parameters $a$ and $b$ in the Equation 1 depending on the actually measured value of the quality and temperature $Tm$ in a manner as described below. Suppose that $Tm(0)$, $Tm(1)$, $Tm(2) \ldots Tm(t)$ are the actually measured values of temperature $Tm$ at respective times 0, 1, 2, ..., $t$, and $Q(0)$, $Q(1)$, $Q(2)$, .. $Q(t)$ are the actually measured values of the quality at respective times $0+\tau$, $1+\tau$, $2+\tau$, ... $t+\tau$ (where $\tau$ is the period of time required until the influence of temperature $Tm$ has an effect on the quality value). Then, the values of the parameters $a$ and $b$ at time $t+1$ are determined so that the following formula takes its minimum value:

$$\sum_{n=0}^{t} \{Q(_n) - aTm(_n) - b\}^2 \gamma^{t-n} \quad (2)$$

where $t \geq 1$ and $\gamma$ is the weighting factor for time.

More precisely, the values of the parameters $a$ and $b$ are given by the following formulas:

$$a = \frac{\overline{Q(t) \cdot Tm(t)} - \overline{Tm(t)} \cdot \overline{Q(t)}}{\overline{\{Tm(t)\}^2} - \{\overline{Tm(t)}\}^2} \quad (3)$$

$$b = \frac{\overline{Q(t)} \cdot \overline{\{Tm(t)\}^2} - \overline{Tm(t)} \cdot \overline{Q(t) \cdot Tm(t)}}{\overline{\{Tm(t)\}^2} - \{\overline{Tm(t)}\}^2} \quad (4)$$

where $$\overline{Q(t) \cdot Tm(t)} = (1-\gamma) \cdot Q(t) \cdot Tm(t) + \gamma \cdot \overline{Q(t-1) \cdot Tm(t-1)} \quad (5)$$

$$\overline{Tm(t)} = (1-\gamma) \cdot Tm(t) + \gamma \cdot \overline{Tm(t-1)} \quad (6)$$

and $\overline{Q(t)}$, $\overline{Tm(t)^2}$, etc. are similar determined.

Thus, the model correcting device 9 corrects the parameters $a$ and $b$ in the Equation (1) obtained by the predictive model 8 so that they have the values given by the Formulas 3 and 4. The signal representative of the deviation of the predictive quality value from a desired value produced by a desired value setting device 10 is applied to a manipulated value deciding device 11.

The manipulated value deciding device 11 decides the manipulated variables which are to be corrected to eliminate the deviation and is designed to correct a plurality of manipulated variables so that an increase or decrease in the temperature within the reactor 2 resulting from the variation in the specific manipulated variables may not obstruct the persistence of the reaction. For instance, when the predictive quality value becomes lower than the desired value, the amount of the initiator F which exerts the strongest influence on the quality of the product may be increased. However, when the reaction becomes excessively vigorous due to the increase in the amount of the initiator F and there is a fear that the reaction may enter the decomposition reaction range, which is practically judged by the magnitude of the maximum temperature $Tn$, the temperature of the fluid in the heat exchanger 3 or 4 which exerts little influence on the quality compared with the initiator F but which exerts a great influence on the maximum temperature $Tn$ may be reduced to avoid such an objectionable phenomenon.

In some circumstances, the highest reaction zone does not occur at a specific position within the reactor and may shift to and fro within the reactor. An effective system to deal with such a case may include a plurality of predictive models corresponding to the respective indications of a plurality of temperature detectors so that these predictive models may be suitably switched over depending on the precision of prediction.

What is claimed is:

1. In a tubular ethylene polymerization apparatus comprising a compressor for compressing a mixture of components including ethylene gas, an initiator, a modifier and other required agents supplied thereto and for providing an output of the compressed mixture, a tubular reactor for receiving the compressed mixture and having a heat exchanger for causing a polymerizing reaction within the reactor such that a product is formed in the reactor which is provided as an output of the reactor, and a product separator for receiving the product of the reactor and separating ethylene polymer from unreacted gases and providing an output of ethylene polymer, at least one of the components of the mixture and a fluid of the heat exchanger being a manipulatable variable to control the ethylene polymerization reaction, and a predictive control system means for controlling the ethylene polymerization reaction, the predictive control system means comprising temperature detecting means for detecting the temperature distribution throughout the extent of the reactor, at least one predictive model means responsive to the temperature detecting means for initially providing an output signal representative of a predictive quality value of the ethylene polymer to be produced in accordance with the value of temperature detected in a highest reaction zone of the reactor, a desired quality value setting means for providing an output signal of a desired quality value of the produced ethylene polymer, a manipulated value deciding means responsive to the predictive model means and the quality value setting means for receiving a signal representative of the difference between the predictive quality value signal and the desired quality value signal for changing at least one of the manipulatable variables to control the reaction within the reactor depending on the deviation of the predictive quality value from the desired quality value, a quality inspection device receiving the produced ethylene polymer from the product separator for measuring the quality value of the produced ethylene polymer and providing an output signal indicative thereof, and model correcting means responsive to the temperature detecting means and the output signal of the quality inspection device for providing an output signal to the predictive model means of temperature detecting positions, the predictive model in accordance with the detected temperature value and the measured quality value of the produced ethylene polymer, the predictive model means then being responsive to the output signal of the model correcting means for varying the predictive quality value output signal in accordance with the measured quality value of the produced ethylene polymer.

2. A predictive control system means as claimed in claim 1, wherein the temperature detecting means has a plurality of temperature detecting positions throughout the extent of the reactor and a plurality of predictive model means are provided corresponding to the plurality of temperature detecting positions, the predictive model means being arranged to be switched over depending on the precision of prediction.

References Cited

UNITED STATES PATENTS

| | | | |
|---|---|---|---|
| 3,306,889 | 2/1967 | Schappert | 260—94.9 |
| 3,079,372 | 2/1963 | Fulknier, et al. | 260—94.9 |
| 3,558,045 | 1/1971 | Smith et al. | 260—94.9 P X |
| 2,974,017 | 3/1961 | Morgan | 235—151.12 MRI |
| 3,594,559 | 7/1971 | Pemberton | 235—151.12 |

JAMES H. TAYMAN, JR., Primary Examiner

U.S. Cl. X.R.

23—253 A, 253 R, 290, 230; 260—94.9 P, 95 A, 698, 700; 235—151.12, 151.13